US011941978B2

(12) United States Patent
Neill et al.

(10) Patent No.: US 11,941,978 B2
(45) **Date of Patent: *Mar. 26, 2024**

(54) DERIVING TRAFFIC SIGNAL TIMING PLANS FROM CONNECTED VEHICLE TRAJECTORY DATA

(71) Applicant: TRAFFIC TECHNOLOGY SERVICES, INC., Beaverton, OR (US)

(72) Inventors: Justin Michael Neill, Woodburn, OR (US); Brandon Keith Sams, Fairview, OR (US); Jonah Aaron Pincetich, Portland, OR (US); Darryl Joseph Michaud, Portland, OR (US); Thomas Bauer, Beaverton, OR (US); Jingtao Ma, Portland, OR (US)

(73) Assignee: TRAFFIC TECHNOLOGY SERVICES, INC., Beaverton, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 17/947,106

(22) Filed: Sep. 17, 2022

(65) Prior Publication Data

US 2023/0013604 A1 Jan. 19, 2023

Related U.S. Application Data

(63) Continuation of application No. 17/173,096, filed on Feb. 10, 2021, now Pat. No. 11,482,104.

(Continued)

(51) Int. Cl.
*G08G 1/08* (2006.01)
*G08G 1/01* (2006.01)

(52) U.S. Cl.
CPC ............. *G08G 1/08* (2013.01); *G08G 1/0104* (2013.01)

(58) Field of Classification Search
CPC .......... G08G 1/08; G08G 1/0104; G08G 1/07; G08G 1/0129; G08G 1/0145; G08G 1/0112; G08G 1/085
See application file for complete search history.

(56) References Cited

U.S. PATENT DOCUMENTS 5,539,398 A 7/1996 Hall et al.
2007/0005224 A1 1/2007 Sutardja
(Continued)

FOREIGN PATENT DOCUMENTS

EP 1615190 A2 1/2006
EP 2824647 A1 1/2015

OTHER PUBLICATIONS

"Connected Vehicles", retrieved from the internet on Oct. 17, 2019; https://trafficproducts.netlconnected-vehicles (3 pages).
(Continued)

*Primary Examiner* — Joseph H Feild
*Assistant Examiner* — Sharmin Akhter
(74) *Attorney, Agent, or Firm* — FisherBroyles, LLP; Jeremy P. Sanders

(57) ABSTRACT

Traffic signal timing plans are derived from vehicle trajectory or probe data. The probe data is collected and archived in a datastore over a sample time on the order of weeks or longer. Probe data is corrected for clock drift, geo-fence filtered to a selected intersection, and then stop line crossings in the intersection are identified and analyzed along with related data to determine the timing plans and schedule for the intersection. In this way, access to government agency timing plans is obviated so as to save time and expense.

14 Claims, 10 Drawing Sheets

Related U.S. Application Data

(60) Provisional application No. 62/976,253, filed on Feb. 13, 2020.

(56) References Cited

U.S. PATENT DOCUMENTS

| | | | | |
|---|---|---|---|---|
| 2011/0037619 | A1 | 2/2011 | Ginsberg et al. | |
| 2011/0095908 | A1 | 4/2011 | Nadeem et al. | |
| 2016/0027300 | A1* | 1/2016 | Raamot | G08G 1/0145 340/922 |
| 2020/0101844 | A1 | 4/2020 | Miller, Jr. et al. | |

OTHER PUBLICATIONS

Perry, Frank, "UFTI DSRC and Other Communication Options for Transportation Connectivity Workshop: Overview of DSRC Messages and Performance Requirements", May 3, 2017 (34 pages).

Zhang et al., "Increasing Traffic Flows with DSRC Technology: Field Trials and Performance Evaluation", arXiv:1807.01388 [cs. NI]; submitted to the 44th Annual Conference of the IEEE Industrial Electronics Society (IECON 2018), special session of Connected-and-Automated Vehicle Integration, Safety, and Environment Design, on Jun. 30, 2018 (6 pages).

"Intelligent Transportation Systems—ITS Deployments", retrieved from the internet on Oct. 17, 2019; https://www.its.dot.gov/pilots/roadside_unit.htm (2 pages).

Blokpoel and Vreeswijk, "Uses of probe vehicle data in traffic light control", Transportation Research Procedia, 14 ( 2016) 4572-4581.

SPaT Challenge Verification Document Revised—Oct. 30, 2017, Version 1.2 (39 pages).

Traffic Signal Timing Manual, Chapter 4, Traffic Signal Design (29 pages).

* cited by examiner

ANALYZE CROSSINGS TO FIND GREEN START TIMES

DERIVING TRAFFIC SIGNAL TIMING PLANS FROM CONNECTED VEHICLE TRAJECTORY DATA

RELATED APPLICATIONS

This application is a non-provisional of and claims priority to U.S. Provisional Application No. 62/976,253 filed Feb. 13, 2020.

COPYRIGHT NOTICE

© 2020-2021 Traffic Technology Services, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This disclosure is in the field of traffic engineering and pertains to pertains to methods, systems and software to derive traffic signal timing plans from connected vehicle trajectory data.

BACKGROUND OF THE INVENTION

In many places, especially larger cities, smooth flow of vehicular traffic (and often, pedestrian or cyclist safety) depends on electric traffic control signals—for example, those that display the common green-yellow-red sequence of lights. Traffic signals generally operate according to a timing plan. There may be different timing plans for time of day (say, rush hours), days of the week, holidays, etc.

Our U.S. Pat. No. 9,396,657 (Bauer, et al.) teaches methods and apparatus for prediction of traffic signal state changes. That patent discloses a computer software emulator to emulate operation of a field traffic signal controller (FSC) at a given location, utilizing its associated timing parameters, to predict state changes. Traffic signals run on scheduled timing plans at different times, by time of day, day of week, and holidays or special events. These timing plans and schedules are obtainable from local or regional agencies' central computers, databases, or hardcopy file archives that are used to enter the traffic signal controllers.

Determining a fixed-time timing plan for a signalized intersection can be accomplished by real-time monitoring of the traffic controller, and more specifically acquiring signal state data from the controller. Traffic control signal state data can be obtained in real time by interfacing to individual traffic signal controllers (often housed in a metal box on a street corner), and or interfacing to a central traffic control server. In either case, permission and cooperation of the local traffic control authority is needed, and the cost and delay of developing and deploying such interfaces is substantial.

Improved performance, scalability and lower cost can be obtained if timing plans could be determined without relying on interfacing with the signal control system. The present disclosure addresses this and other challenges.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

The present disclosure obviates reliance on live state data from traffic signal controllers or related infrastructure, and it does not require access to local control signal timing plans. Thus it avoids the costs and delays associated with interfacing to those resources. Instead, according to this disclosure, we generate fixed-time signal timing plans without the need for agency approval or interfacing with traffic control equipment.

In one embodiment, a process consistent with this disclosure may include the following:

provisioning a computer server and software executable in the server to cause the server to carry out the steps of— receive user input to select a subject intersection, wherein the subject intersection is a physical intersection controlled by electric traffic signals based on at least one timing plan;

acquire vehicle trajectory data from a first datastore, the vehicle trajectory data archived over a sampling period of time, and each instance of the trajectory data including a date/time stamp, GPS location, and speed vector of the corresponding vehicle;

access a second datastore to acquire MAP data that defines detailed geometries of the subject intersection;

filter the acquired vehicle trajectory data to form a trajectory dataset of vehicle journeys near the subject intersection;

apply clock drift adjustments to the date/time stamps of the raw trajectory dataset to form a corrected trajectory dataset wherein the data is temporally aligned to actual state changes of the traffic signals at the subject intersection;

analyze the vehicle journeys based on the MAP data to identify stopline crossings at the subject intersection during the sampling period, the stopline crossing datapoints ("crossings") including their respective timestamps; and based on the stop line crossings and the MAP data, determine a first timing plan of the subject intersection.

The innovation generally must be implemented in a combination of hardware and software (i.e., stored, machine-readable instructions) for execution in one or more processors. The volume and complexity of operations involved preclude any manual or "pencil and paper" solution as impracticable. In one preferred embodiment, an implementation of the invention may be provided as a service, for example, over a network such as the internet.

Additional aspects and advantages of this invention will be apparent from the following detailed description of preferred embodiments, which proceeds with reference to the accompanying drawings.

BRIEF DESCRIPTION OF THE DRAWINGS

To enable the reader to realize one or more of the above-recited and other advantages and features of the present disclosure, a more particular description follows by reference to specific embodiments thereof which are illustrated in the appended drawings. Understanding that these drawings depict only typical embodiments of the disclosure and are not therefore to be considered limiting of its scope, the present disclosure will be described and explained with additional specificity and detail through the use of the accompanying drawings in which.

DETAILED DESCRIPTION OF PREFERRED EMBODIMENTS

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments. Like numbers refer to like elements throughout the various views and drawings. As used herein, the term "and/or" includes any and all combinations of one or more of the associated listed items.

Figure 1:
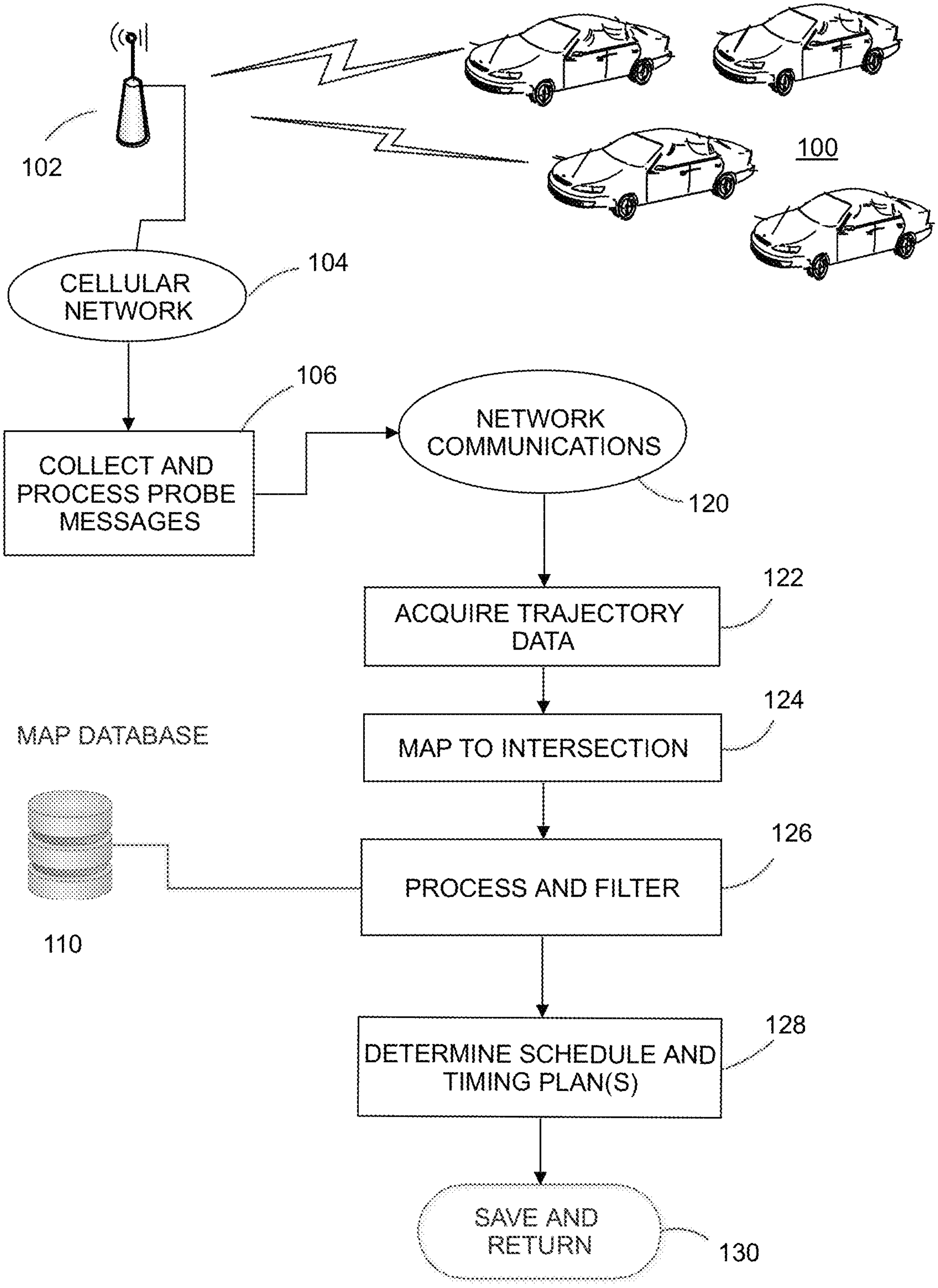
FIG. 1 is a simplified diagram of a system and method for deriving traffic signal timing plans from connected vehicle trajectory data.

FIG. 1 is a simplified diagram of a system and method for deriving traffic signal timing plans from connected vehicle trajectory data. In FIG. 1, a plurality of vehicles 100 are variously equipped to transmit data regarding their GPS location, and typically speed and direction. This may be called probe data or trajectory data. Alternatively, speed and direction can be calculated in a server based on a series of location traces. In some systems, vehicles may transmit or update probe data every few seconds. The latest new vehicles are expected to provide data updates around once per second. Some or all of the vehicles may transmit data over a radio or "cell phone" channel to a wireless receiver antenna 102, for example, a cell tower. The cell tower antenna is coupled to a cellular carrier network 104 to receive the data. In one example, SMS messaging may be used.

The cellular network the transmits the raw data (typically in real-time) to a backend server 106. Ongoing innovations in wireless technology enable collecting probe data from many thousands of vehicles. With speeds of up to 100 gigabits per second, the recent 5G standard is set to be as much as 100 times faster than its predecessor 4G. In the backend server 106, probe data may be archived, and variously processed, for example, to extract timestamps and GPS trace data. The server 106 may record and archive this data over time. In one embodiment of the present disclosure, data collected over sample times of days and weeks is utilized. More data improves the accuracy of traffic analysis as detailed below. In one type of analysis, the data may be assembled based on a vehicle identifier to form a "journey" for a selected vehicle over a selected time period. Below we discuss analysis of vehicle journeys though a selected intersection of interest.

The server 106 may be coupled over a communications network 120, which may be the internet, WLAN, microwave, etc. The network utilized is not critical, and speed (bandwidth) in many cases is not critical, because the analysis processed described below operate on historical data which may be archived over days or weeks. Beginning at the network 120, FIG. 1 shows the principal steps for processing the acquired trajectory data at a high level.

The trajectory data (also called probe data) collection server 122, for a given intersection, filters and maps the incoming probe data to a selected intersection, block 124. Of course, many processes may execute in parallel to provide predictions for many intersections. The data may be further processed and filtered, block 126, down to the individual phase level. To do so, the server may access MAP data from a database 110. In more detail, in a preferred embodiment, a database server may maintain a geo-database, which includes the signal location, the stop lines, the signal phasing, the lane configurations (left turn, through, right turn), and the lane alignment. These data form collectively one set of messages, so-called MAP message defined by the Society of Automotive Engineers (SAE) J2735 standard. This MAP message is the basis to map the probe data to the certain traffic signal and its phases.

The MAP message is used to provide intersection and roadway lane geometry data for one or more locations (e.g. intersections and fragments of maps). Almost all roadway geometry information as well as roadway attributes (such as where a do not block region exists, or what maneuvers are legally allowed at a given point) is contained in the "generic lane" details of this message. MAP messages are used in intersections to number and describe lane level details of each lane.

Figure 2:
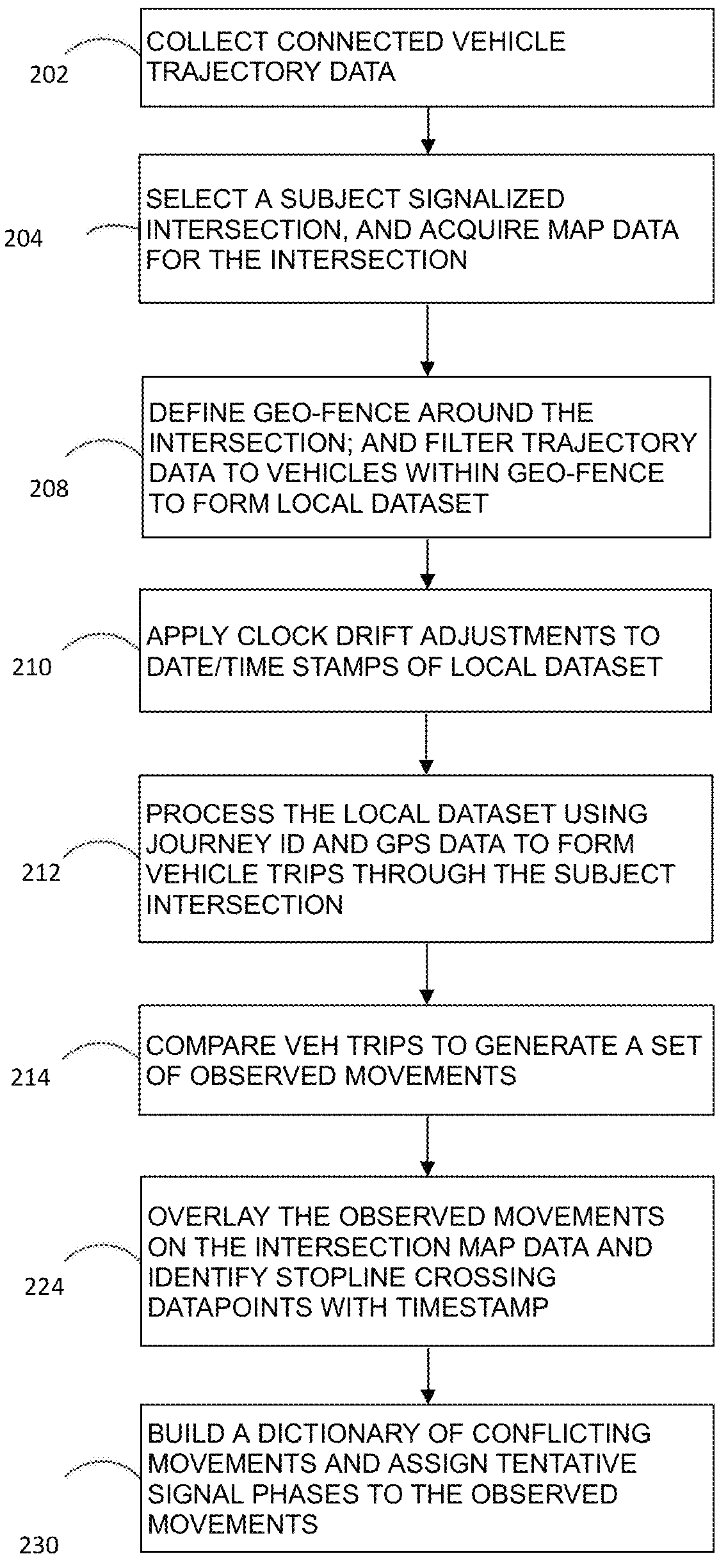
FIG. 2 is a simplified flow diagram of a process to acquire and process connected vehicle trajectory data to generate a signal timing plan for a signalized intersection of interest.

FIG. 2 is a simplified flow diagram of a process to acquire and process connected vehicle trajectory data to generate a signal timing plan for a signalized intersection of interest. Here, beginning at block 202, connected vehicle trajectory data is collected as mentioned with regard to FIG. 1. It may be collected over a sample period of days or week, for example. At block 204, a particular intersection of interest is identified or selected for example, by user input. We will call this the subject intersection. MAP data is acquired for the subject intersection using known methods. At block 208 an area or "geo-fence" is defined around the subject intersection. The geo-fence is large enough to include all the approaches to the subject intersection; but it should not be so large as to infringe on other intersections. Then the trajectory data is filtered to include only data with GPS probe locations within the geo-fence. The resulting dataset may be called a "local dataset" but the moniker is not critical. It should cover a significant sampling period of several days or weeks, even months, depending on the circumstances such as the typical traffic volumes at the intersection.

At block 210, the system (or software) applies clock drift adjustments to the trajectory data. That is, an appropriate adjustment is applied based to each probe timestamp. This is because the clocks that drive the traffic signal controllers are subject to drift, for example, due to local utility system AC voltage phase variations. Clock drift can be cumulative, so that the offset for a timestamp that occurred several weeks earlier may be off by many seconds or even minutes from a more current time stamp. So, while a larger volume of data tends to make the analysis of timing plans more accurate, clock drift correction is critical where the data is acquired over a long sample time.

At block 212, the process next processes the local dataset using journey ID and GPS data to identify vehicle trips through the subject intersection. The vehicle trips are compared to identify observed movements—i.e., trips where vehicles follow the same path through the subject intersection, for example, from the south to the east which may be labeled "northbound-right," see block 214. Next, the process overlays the observed movements on the intersection map data identifies stopline crossings in the data, block 224. That is, stopline crossing datapoints are collected, with corresponding GPS locations and timestamps. GPS location may by replaced in some embodiments by a stopline identifier.

Figure 3:
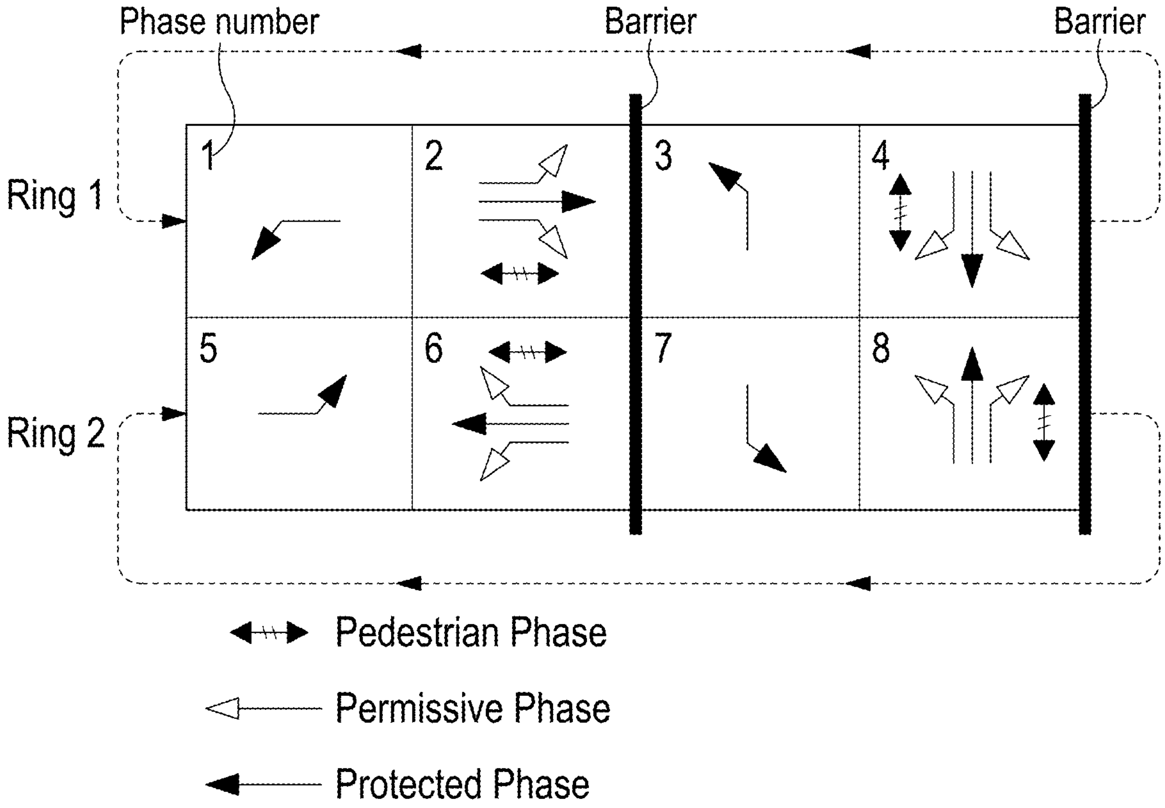
FIG. 3 (prior art) is an example of a standard ring-and-barrier structure to illustrate an intersection operation.

FIG. 3 (prior art) is an example of a standard ring-and-barrier structure to illustrate an intersection operation. (From Federal Highway Administration Publication Number: FHWA-HRT-04-091 Dated: August 2004.) Signal phasing at most intersections in the United States makes use of a standard National Electrical manufacturers association (NEMA) ring-and-barrier structure, shown in FIG. 3. This structure organizes phases to prohibit conflicting movements (e.g., eastbound and southbound through movements) from timing concurrently while allowing nonconflicting movements (e.g., northbound and southbound through movements) to time together. Most signal phasing patterns in use in the United States can be achieved through the selective assignment of phases to the standard NEMA ring-and-barrier structure. The dashed lines indicate the ring structure in that the phase sequence repeats so just one full cycle is shown.

Figure 4A:
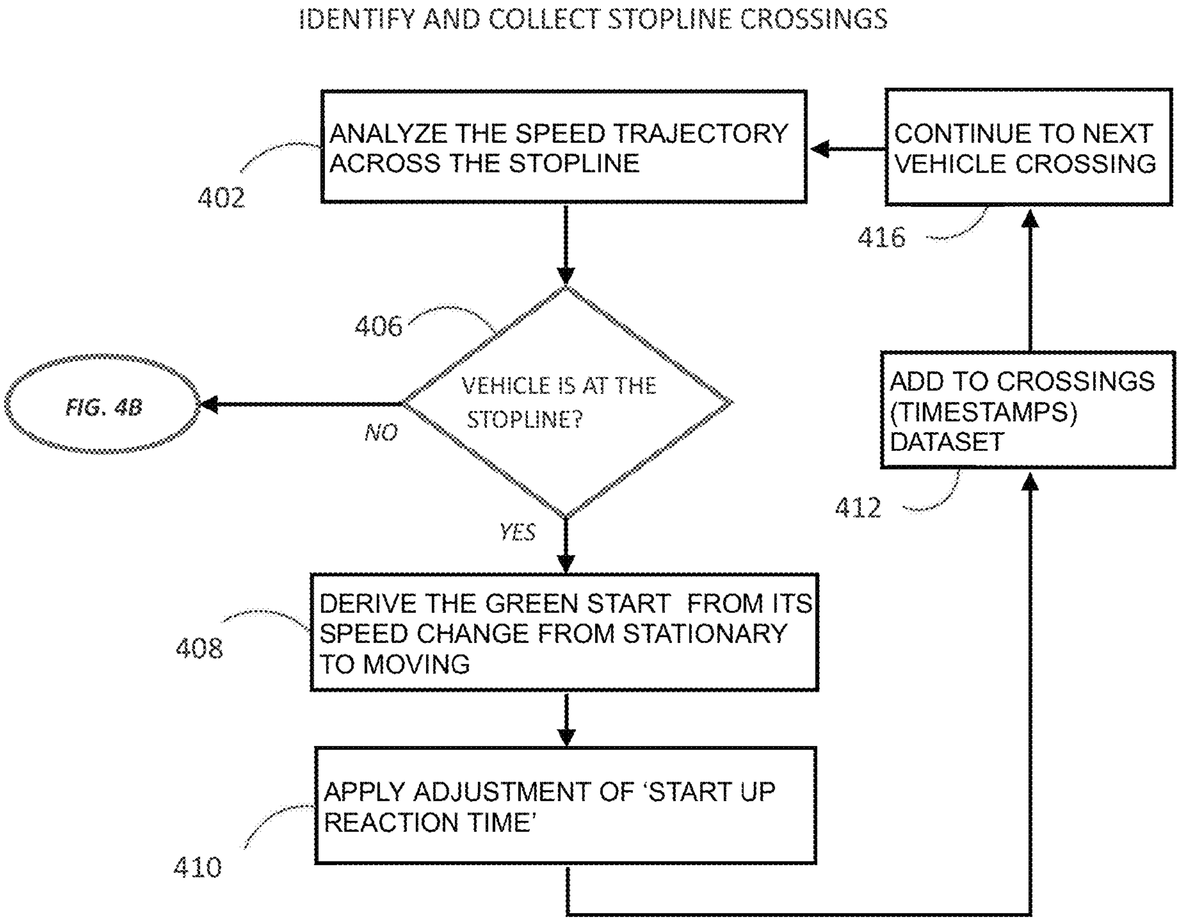
FIG. 4A is a simplified flow diagram illustrating a process to build a dataset of stopline crossings.

FIG. 4A is a simplified flow diagram illustrating a process to build a dataset of stopline crossings. The process analyzes the vehicle speed trajectory across the stopline, block 402. First, a vehicle may be stopped at a stopline. For example, it's location may remain unchanged for a few seconds. If the vehicle is stopped, determined at decision 406, then the start of green time for that movement may be derived from the vehicle speed change from stationary to moving, block 408. Then, a startup reaction time adjustment is made, to account for delay from the signal change to green, to the vehicle actually moving, step 410. Driver reaction time is generally about two seconds (if they are paying attention). The adjusted crossing instance (including timestamps) is then added to a dataset, step 412, and the process loops to process a next vehicle crossing in the local dataset, step 416.

Figure 4B:
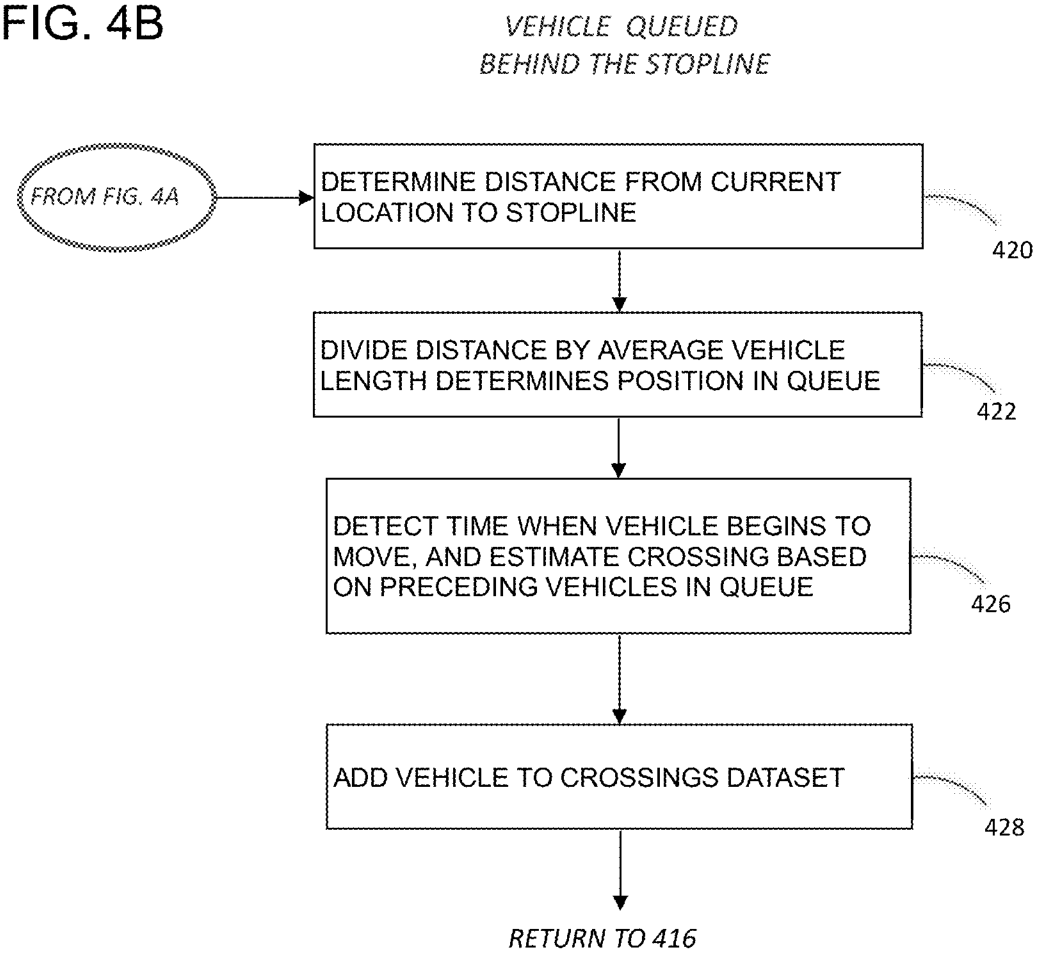
FIG. 4B is a continuation of FIG. 4A for vehicles queued behind the stopline.

FIG. 4B is a continuation of FIG. 4A to consider vehicles queued behind the stopline. This is an optional enhancement to the basic process; it is not critical to generating timing plans, but this additional analysis can improve accuracy of the derived timing plan(s) and reduce the amount of required trajectory data sets as more data points can be utilized. Here, the process determines a distance from the current location to the stopline, i.e. distance behind the line, step 420. In an embodiment, we add a traffic engineering flow and queue dispersion model to each observed crossing to the point where the respective vehicle was stopped and thus assumed queued. The distance from that point to the stop line divided by the average vehicle length determines its position in the queue. Green start is then the moment when the vehicle is observed to start minus the number of preceding vehicles in queue multiplied by the inverse of saturation flow rate multiplied by 3600 plus the startup loss time. All of these parameters are known to people skilled in the art of traffic engineering. With each crossing sample now providing an estimated green time start, fewer crossing samples are required to compute a statistically valid green time start time.

Figure 5:
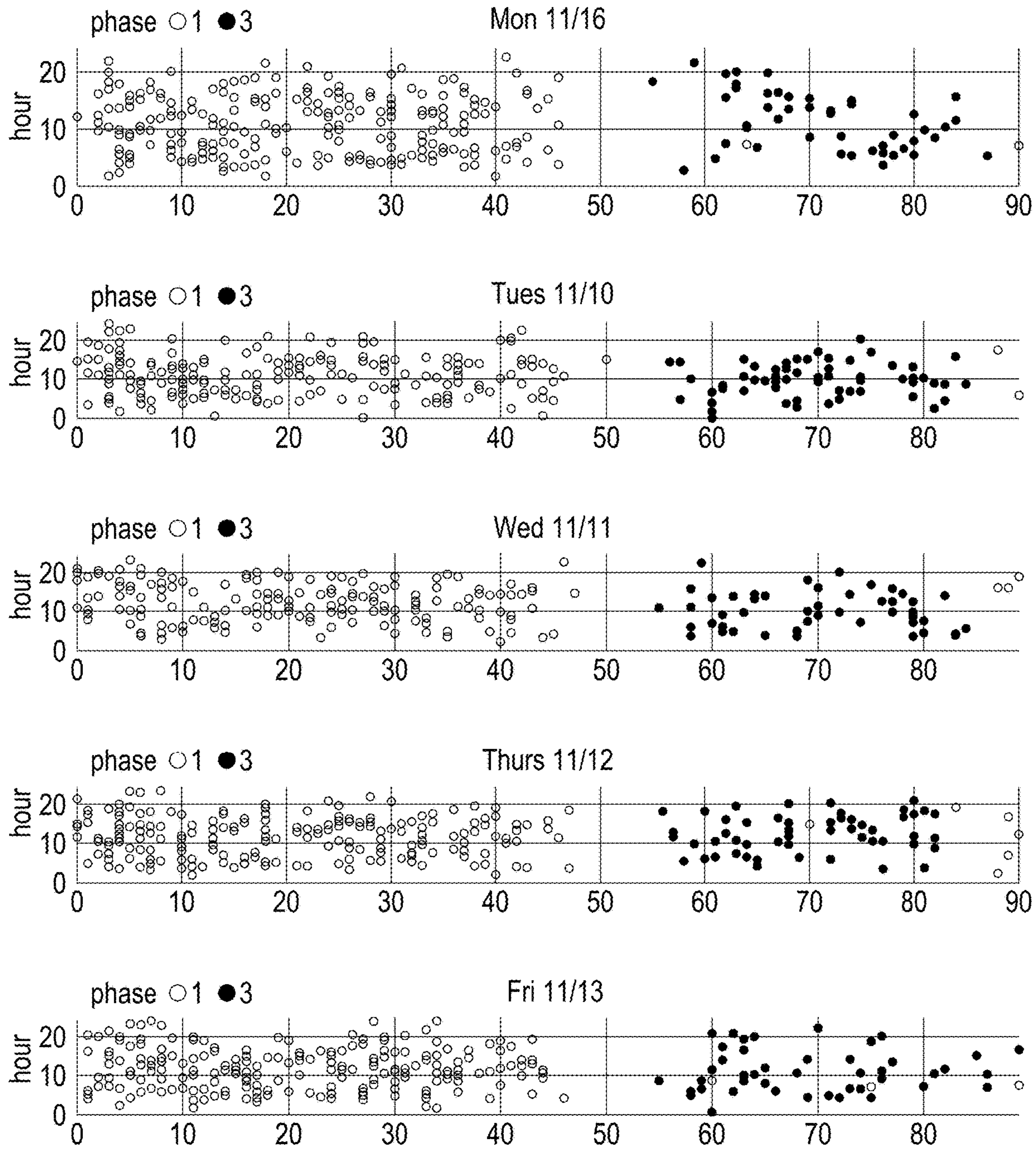
FIG. 5 is a plot showing an example of vehicle crossings data at an intersection over several days.

FIG. 5 is a plot showing an example of vehicle crossings data at an intersection plotted over several days (Monday through Friday). This shows two phases; phase 1 crossings are circles (or open dots) and phase 3 crossings are indicated by solid black dots. The MUTCD defines a signal phase as the right-of-way, yellow change, and red clearance intervals in a cycle that are assigned to an independent traffic movement or combination of traffic movements. Signal phasing is the sequence of individual signal phases or combinations of signal phases within a cycle that define the order in which various pedestrian and vehicular movements are assigned the right-of-way. In the present case we are not concerned with pedestrian movements as we address only fixed-timing plans.

In an embodiment, determining signal phases from probe data comprises executing software to apply statistical analysis to the data, to identify "clumps" or relatively dense periods, representing many dots (crossings) per unit time, as compared to relatively sparse time periods, i.e., where there are very few dots (crossings). The dense periods correspond to traffic flowing through the intersection—crossing the stop line; whereas few or zero crossings indicate no traffic flow, i.e., a red light, for the corresponding phase during that period. There may be a random crossing due to noise in the data or driver error. Conflicting movements (and thus phases) can be determined from the intersection MAP data. So, on Monday 11/16 in drawing, we see a dense period from cycle time 0 to around cycle time 48 (typically seconds). At that point, the signal changes to yellow then red. There is generally an all-red clearing period, here around time 48-55. Then traffic starts flowing in phase 3, from cycle time 55 to abound 85. We see a phase 1 dot at 90, suggesting start of a new cycle. This indicates a cycle time of around 90 seconds. In practice, this analysis is conducted over a large number of cycles, for hours and days. The cycle length is determined by adjusting a nominal or starting length to find a value that best causes the crossings from each approach to occur during the same portion of the cycle over the timing plan's coverage time period. In this figure, it appears that the same timing is used for all weekdays. This will become part of the timing schedule, discussed below.

Figure 6:
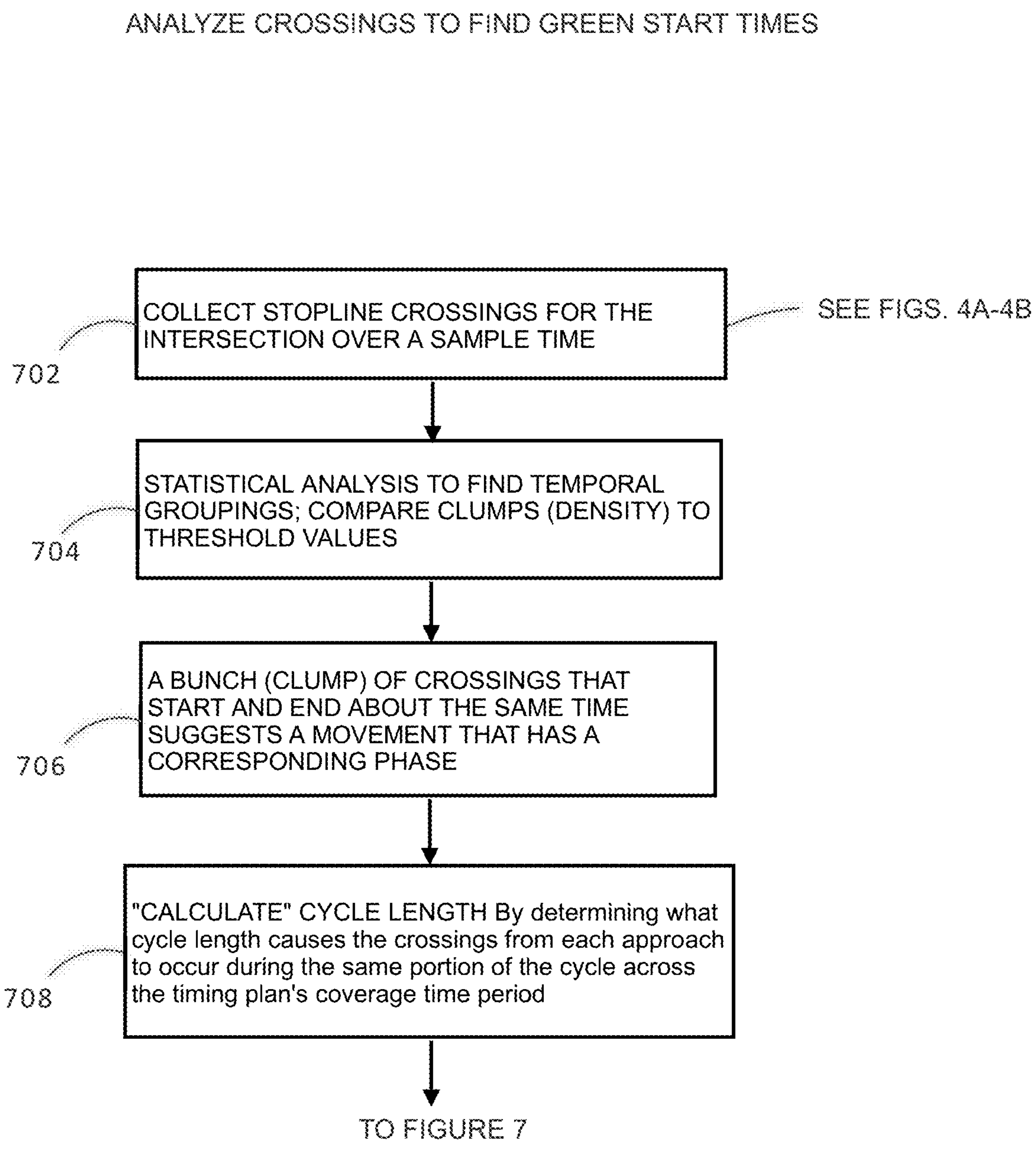
FIG. 6 is a simplified flow diagram illustrating an example process to analyze vehicle crossings to find green start times.

FIG. 6 is a simplified flow diagram illustrating an example process to analyze vehicle crossings to find green start times. As discussed, stopline crossing data ("crossings") is collected for the subject intersection over a sample period of time, preferably several weeks, block 702. The crossing data is analyzed, as discussed above with respect to FIG. 5, to determine movements and phases, blocks 704, 706. The cycle length is determined by adjusting a nominal or starting length to find a value that best causes the crossings from each approach to occur during the same portion of the cycle across the timing plan's coverage time period, block 708.

Figure 7:
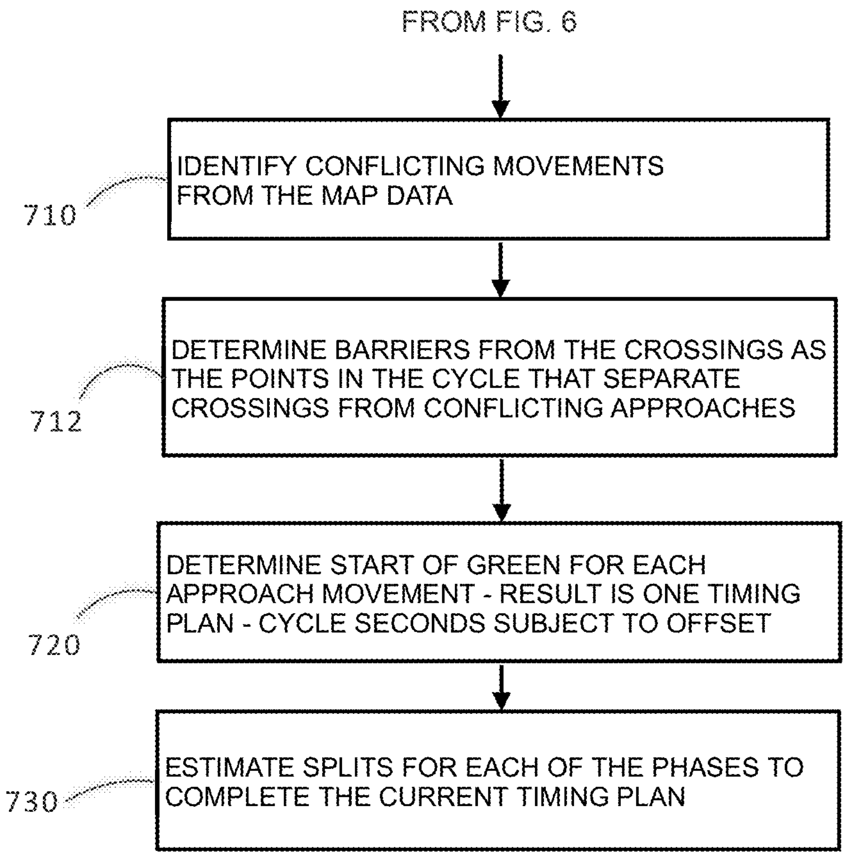
FIG. 7 is a continuation from FIG. 6.

FIG. 7 is a continuation from FIG. 6. Part of this process is to identify from the MAP data conflicting movements, block 710. Barriers are determined from the crossing data as those points in the cycle that separate crossings from conflicting approaches, block 712. Then, start of green times for each approach or movement are determined from the data, and the result is a first timing plan for the subject intersection, block 720. The start times preferably are adjusted to align to a zero time, for example, midnight local time. It remains to estimate splits for each of the phases to complete the first timing plan, block 730. This can be done by backing off from a green start time to estimate the end of the preceding phase.

Figure 8:
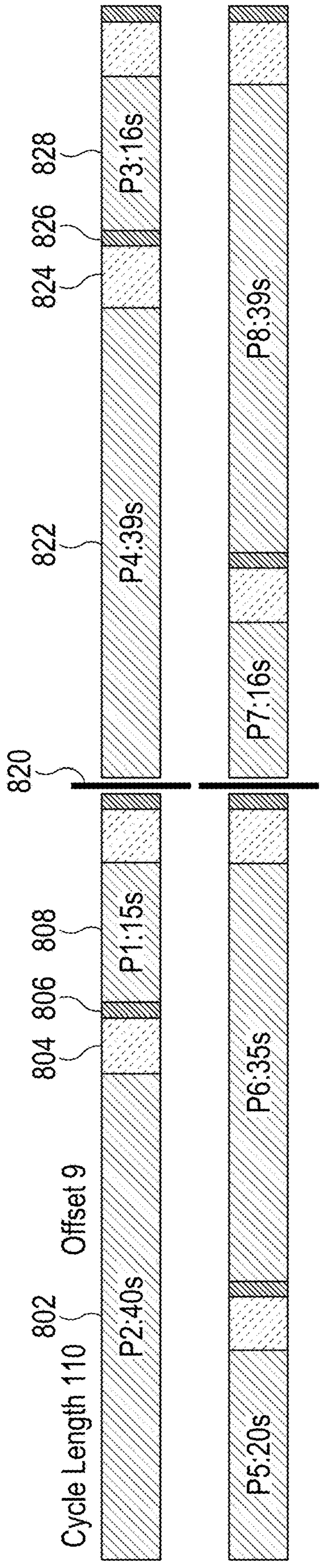
FIG. 8 is an example "ring and barrier" timing diagram showing the sequence of an example traffic signal cycle derived from vehicle probe data.

FIG. 8 is an example "ring and barrier" timing diagram illustrating an example traffic signal timing plan derived from vehicle probe data. This example indicates a cycle length of 110 seconds. There is also an indicated offset of 9 seconds. Offset is generally not needed outside the United States. It is used to start each individual signal's cycle always at "cycle second 0" and as such you need to define an offset to the master clock. In some countries, the concept of a local cycle does not exist and each signal's timings are always expressed in master clock time. An easy analogy is time zones. The offset is like a time zone's offset to Greenwich time. We could get rid of time zones and simply all use Greenwich time all over the world.

Referring again to FIG. 8, the upper portion, like a horizontal bar, is one ring; the lower portion is another ring. The drawing shows a phase 2 ("P2") 40 second green time 802, followed by yellow time 804 and red time 806. Phase 1 ("P1") follows immediately, beginning with green time of 15 seconds, at 808, etc. That P1 green split ends at barrier 820. After the barrier, P4 begins with green time 822, then yellow period 824, red time 826, etc.

The upper ring thus has phases P2, P1, P4, and P3 in that order. The lower ring has phases P5, P6, P7 and P8. The numbering is not critical; it is mainly for identification. Phases in the same ring conflict with each other (i.e. they can't be green at the same time). On one side of the barrier (820), the phases in one ring would typically be a through movement and the opposing, conflicting left turn. Because the movements conflict, they are placed in the same ring so they cannot receive green at the same time. (Ring-barrier diagrams are only used in North America. Similar diagrams exist elsewhere, utilizing different nomenclature.)

Figure 9:
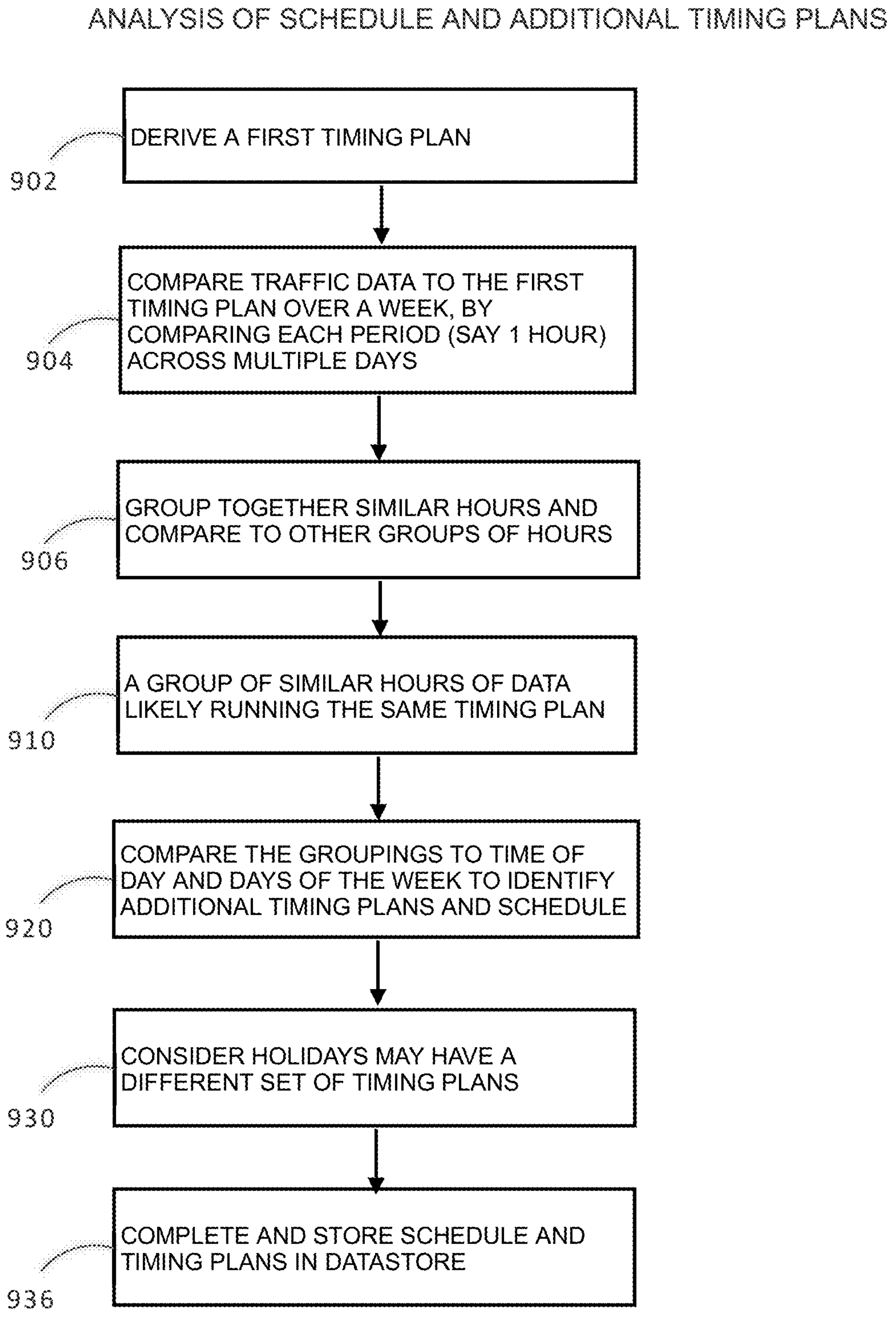
FIG. 9 is a simplified flow diagram illustrating an example process to determine additional timing plans and schedule for the subject intersection.

FIG. 9 is a simplified flow diagram illustrating an example process to determine additional timing plans and schedule for the subject intersection. In an embodiment, the process derives a first timing plan as discussed above, block 902. Then traffic data is compared to the first timing plan over several days, preferably a week, by comparing periods of say one hour, at the same time each day, over the several days. See block 904. A time period on the order of an hour (it is not critical) is selected to be long enough to include many timing cycles, but not so long as to extend over multiple timing plan changes. Based on the comparisons, "similar hours" (in terms of timing plan) may be grouped together, and the resulting group may be compared to other groups, as similar groups are likely running the same timing plan, block 910.

Next, we compare the groups to time of day and days of the week to identify additional timing plans for the intersection and define the timing plan schedule as to when each timing plan is used, block 920. For example, it may be that hours 8 am to 6 pm are all similar over multiple days, thus forming a group; this group may be part of a "daytime" timing plan. Another similar hours group, say from 6 pm to midnight, may form an "evening" timing plan for the subject intersection, etc. There may be different plans for different days of the week. There may be others such as "rush hour" plans in the a.m. and or pm. There may be weekend plans and or holiday plans, etc., see 930. All of these can be determined as described, stored in the datastore, and added to the timing plan schedule for the intersection, block 936.

Implementation Hardware and Software

Most of the equipment discussed above comprises hardware and associated software. For example, the typical electronic device is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

Having described and illustrated the principles of the invention in a preferred embodiment thereof, it should be apparent that the invention may be modified in arrangement and detail without departing from such principles. We claim all modifications and variations coming within the spirit and scope of the following claims.

The invention claimed is:

1. A method comprising:

selecting a subject intersection, wherein the subject intersection is a physical intersection controlled by electric traffic signals based on at least one timing plan;

acquiring vehicle trajectory data from a first datastore, the vehicle trajectory data archived over a sampling period of time;

acquiring MAP data that defines detailed geometries of the subject intersection;

filtering the acquired vehicle trajectory data to form a trajectory dataset of vehicle journeys near the subject intersection;

applying clock drift adjustments to a date/time stamps of the vehicle trajectory data to form a corrected trajectory dataset;

analyzing the vehicle journeys based on the MAP data to identify stopline crossings at the subject intersection during the sampling period; and determining, based at least in part on the stopline crossings and the MAP data, a first timing plan of the subject intersection.

2. The method of claim 1 wherein filtering the acquired vehicle trajectory data includes: defining a geo-fence area around the subject intersection based on the MAP data; and comparing the vehicle trajectory data to the geo-fence area to exclude the data outside of the geo-fence area.

3. The method of claim 1 wherein the sampling includes at least a few weeks.

4. The method of claim 1 wherein analyzing the vehicle journeys to identify stopline crossings includes:

comparing vehicle trips to generate a set of observed movements of the subject intersection; and overlaying the observed movements on the map data to identify the stopline crossing datapoints.

5. The method of claim 1 and further comprising:

interpolating the timestamps of trajectory datapoints that are before and after a stopline to determine a timestamp for the corresponding stopline crossing.

6. The method of claim 4, and further comprising:

comparing the observed movements and corresponding timestamps to identify which of the movements move together, evidenced by crossing corresponding stoplines at about the same time; and assigning a phase to the observed movements that move together.

7. The method of claim 6 and further comprising:

based on the MAP data, observed movements and stopline crossings, determining a temporal sequence of the assigned phases;

based on the phase sequence, cycle length, offset, which phases start together and which phases end together, determining a start of green time for each phase to generate the first timing plan of the subject intersection.

8. The method of claim 7 and further comprising:

for each of the phases, deducting a yellow+all red period from the start of green time of a phase to determine an end of green time of a next preceding phase; and add the end of green time for each phase to the first timing plan.

9. The method of claim 8 and further comprising selecting a fixed yellow+red time of approximately 5-7 seconds.

10. A method comprising:

selecting a subject intersection, wherein the subject intersection is a physical intersection controlled by electric traffic signals based on at least one timing plan;

accessing a first datastore to acquire MAP data that defines detailed geometries of the subject intersection, including stoplines, movements and lane alignment data;

defining a geo-fence area around the subject intersection based at least in part on the MAP data;

accessing a second datastore to acquire a set of trajectory data that were received from a plurality of wirelessly-connected vehicles over an analysis period of time, each instance of the trajectory data including one or more of a date/time stamp, GPS location, and speed vector of the corresponding vehicle;

applying clock drift adjustments to the date/time stamps of the trajectory data to form a corrected trajectory dataset wherein the data is temporally aligned to actual state changes of the traffic signals at the subject intersection;

filtering the corrected trajectory dataset to select data in which an indicated GPS location is inside the geo-fence area to form a local dataset;

process the local dataset to group trajectory points based on a journey id in each datum for at least some of the vehicles in the local data set, each group of trajectory points representing the corresponding vehicle's trip through the subject intersection;

identifying a set of observed movements based on which vehicles move together according to the local dataset;

overlaying the observed movements on the subject intersection MAP data to identify stopline crossing datapoints ("crossings") for each journey, each stopline crossing datapoint including its corresponding clock drift-adjusted timestamp;

applying statistical analysis to the adjusted timestamps of the crossings to identify signal phases;

determining a timing cycle length that best causes the crossings from each approach to occur during the same portion of the cycle over the timing plan's coverage time period;

determining barriers from the crossings as the points in the cycle that separate crossings from conflicting approaches;

adjusting cycle offset so one phase does not wrap-around in ring barrier diagram;

determining a start of green time for each approach's movements based on when the earliest point in the cycle that crossings are typically observed for that movement restricted to the barrier for that approach; and generating, based at least in part on the identified signal phases, the timing cycle length, the barrier, and the start of green times, a first timing plan for the subject intersection.

11. The method of claim 10 and further comprising:

comparing traffic data at the intersection to the first timing plan over several days, including identifying time periods for which the traffic data are similar at the same time each day, over the several days;

collecting the similar time periods to form a group; comparing the group to other groups formed at other times;

based on the comparisons, identify similar groups as likely running a common timing plan;

if the common timing plan is not the same as the first timing plan, add the common timing plan as a second timing plan for the subject intersection, and add the second timing plan to a timing plan schedule for the intersection, based on the times and days that it is in use.

12. The method of claim 11 and further comprising processing additional groups to determine additional timing plans of the intersection until all times of day and days of the week have a corresponding plan in the timing plan schedule.

13. The method of claim 11 and further comprising identifying a holiday timing plan and adding the holiday timing plan to the timing plan schedule.

14. The method of claim 10 and further comprising the steps of:

for a vehicle location spaced (queued) behind a stopline, determine a distance from a current location to the stopline;

apply a traffic engineering flow and queue dispersion model to each observed crossing relating it to the location where the respective vehicle was stopped and thus assumed queued;

The distance from the current location to the stopline is divided by an average vehicle length to determine the vehicle's position in the queue;

identify as a green start time a moment when the vehicle is observed to start minus the number of preceding vehicles in queue multiplied by the inverse of saturation flow rate multiplied by 3600 plus a startup loss time; and adding this queued vehicle green start time to the other crossing data for the intersection for timing plan analysis.

* * * * *